(12) United States Patent
Fröhlich

(10) Patent No.: US 11,469,644 B2
(45) Date of Patent: Oct. 11, 2022

(54) MULTIPART ROTOR SHAFT FOR AN ELECTRIC MACHINE

(71) Applicant: Vitesco Technologies GMBH, Hannover (DE)

(72) Inventor: Holger Fröhlich, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 104 days.

(21) Appl. No.: 16/795,125

(22) Filed: Feb. 19, 2020

(65) Prior Publication Data

US 2020/0186003 A1 Jun. 11, 2020

Related U.S. Application Data

(63) Continuation of application No. PCT/EP2018/069200, filed on Jul. 16, 2018.

(30) Foreign Application Priority Data

Aug. 21, 2017 (DE) .................... 10 2017 214 507.2

(51) Int. Cl.
*H02K 7/00* (2006.01)
*H02K 9/193* (2006.01)
*H02K 9/14* (2006.01)

(52) U.S. Cl.
CPC ............. *H02K 7/003* (2013.01); *H02K 9/193* (2013.01)

(58) Field of Classification Search
CPC .......... H02K 9/14; H02K 7/083; H02K 9/193; H02K 7/003
USPC ................................ 310/52, 54, 58, 60 A, 61
See application file for complete search history.

(56) References Cited

U.S. PATENT DOCUMENTS

| 2,706,260 | A | 4/1955 | Heintz et al. |
|---|---|---|---|
| 5,587,616 | A | 12/1996 | Johnsen |
| 6,836,043 | B2 | 12/2004 | Boss et al. |
| 7,182,724 | B2 | 2/2007 | South |
| 8,138,642 | B2 | 3/2012 | Lemmers, Jr. et al. |
| 8,531,069 | B2 | 9/2013 | Amaral |
| 10,461,604 | B2 | 10/2019 | Paul et al. |
| 10,965,185 | B2 | 3/2021 | Kotschau et al. |
| 2016/0233744 | A1 | 8/2016 | Kaneshige et al. |

(Continued)

FOREIGN PATENT DOCUMENTS

| CN | 1660503 A | 8/2005 |
|---|---|---|
| CN | 101931281 A | 12/2010 |
| CN | 102077446 A | 5/2011 |

(Continued)

OTHER PUBLICATIONS

International Search Report and Written Opinion dated Oct. 31, 2018 from corresponding International Patent Application No. PCT/EP2018/069200.

(Continued)

*Primary Examiner* — Jose A Gonzalez Quinones

(57) ABSTRACT

A multipart rotor shaft for an electric machine comprises a first shaft journal with a first end flange and a first axial passage bore, a second shaft journal with a second end flange. The rotor shaft also includes a hollow carrier for a laminated rotor core, a line element for conducting a cooling medium, and a separating element which divides a cavity between the carrier and the line element into a first partial cavity and a second partial cavity.

16 Claims, 2 Drawing Sheets

(56) References Cited

U.S. PATENT DOCUMENTS

2018/0191224 A1* 7/2018 Kotschau .................. H02K 9/19

FOREIGN PATENT DOCUMENTS

| | | |
|---|---|---|
| CN | 105416035 A | 3/2016 |
| CN | 105871099 A | 8/2016 |
| CN | 106082481 A | 11/2016 |
| CN | 106416011 A | 2/2017 |
| CN | 106464085 A | 2/2017 |
| CN | 206211715 U | 5/2017 |
| CN | 206211770 U | 5/2017 |
| CN | 106887914 A | 6/2017 |
| DE | 102014107845 A1 | 12/2015 |
| DE | 102015205724 A1 | 6/2016 |
| DE | 102015223631 A1 | 6/2017 |
| EP | 1366559 B1 | 7/2007 |
| KR | 20170047740 A | 5/2017 |
| WO | 2017050447 A1 | 3/2017 |
| WO | WO-2017050447 A1 * | 3/2017 ............... H02K 9/12 |

OTHER PUBLICATIONS

German Office Action dated Apr. 9, 2018 for corresponding German Patent Application No.
Chinese Office Action dated Dec. 22, 2021 for corresponding Chinese Patent Application No. 201880054182.7.
Chinese Office Action dated Jul. 29, 2021 for corresponding Chinese Patent Application No. 201880054182.7.

\* cited by examiner

MULTIPART ROTOR SHAFT FOR AN ELECTRIC MACHINE

CROSS-REFERENCE TO RELATED APPLICATIONS

This U.S. patent application claims the benefit of PCT patent application No. PCT/EP2018/069200, filed Jul. 16, 2018, which claims the benefit of German patent application No. 10 2017 214 507.2, filed Aug. 21, 2017, both of which are hereby incorporated by reference.

TECHNICAL FIELD

The invention relates to a multipart rotor shaft for an electric machine, in particular, a rotor and an electric machine.

BACKGROUND

Multipart rotor shafts for electric machines are known. Such a rotor shaft typically comprises a cylinder casing terminated by end flanges on both ends, wherein a shaft journal is situated at each end flange. Usually, a coaxial access bore is provided at least in one of the end flanges, in particular in the shaft journal, to form an access for a medium to a shaft cavity surrounded by the cylinder casing. Such hollow rotor shafts may be used where construction should be as lightweight as possible.

A cooling medium may be conducted through the hollow rotor shafts for the purpose of cooling the rotor. In this context, reference is made for example to DE 10 2014 107 845 A1, which describes the supply of a cooling medium to a cavity via a pipe and its discharge again via an outlet. However, this type of cooling may be inadequate under certain circumstances, and disproportional to the structural complexity and the deterioration in running properties of the motor.

Furthermore, electric machines are known in which a medium, e.g. a lubricant or coolant, must be transported from one end to the other end. In this case, the rotor has a purely conductive function for which hollow shafts (well known in themselves) are scarcely suitable. In such machines with conductive function, because of the substantial widening of the line cross-section, running irregularities may occur caused by the expansion of the medium in the hollow shaft and turbulence inside the hollow shaft. Also, a hollow shaft filled with liquid medium may offset again the benefit of weight savings. In particular, filling a hollow cylinder with liquid may have a negative effect on the rotational inertia moment of the electric machine when used therein.

Various solutions are also known for conducting and distributing a cooling medium to a heat transmission surface, most of which entail complete conduction of cooling medium in channels or bores, designed with forced conduction, over the entire axial and radial path lengths.

Finally, the known cooling devices have at least one of the following disadvantages: on the one hand, the cross-sections of lines provided for the cooling medium are selected too small in order to reduce the volume requirement. Here, such a small passage bore scarcely reduces the weight of the rotor shaft to be cooled. Also, because of the small areas concerned, the cooling medium can only be conducted in small quantities to the components to be cooled, in particular to the rotor core which heats up greatly. The coolant often only coats small areas of the heated surface and cannot spread widely over the entire area.

On the other hand, large line cross-sections and cavities in the rotor shaft may not only lead to a large area for heat transmission, but also allow particularly lightweight construction. However, the disadvantage in this case is that in operation, the hollow cylinder must be almost completely filled with coolant since coolant need is higher, leading in turn to an increase in the moved mass, which the lightweight construction is intended to avoid.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Therefore a structurally simple multipart rotor shaft for an electric machine, wherein the rotor shaft can be produced at low cost is desired. A hollow shaft, offers good running properties with a light weight while providing an efficient cooling function and conduction function.

According to a first aspect, a multipart rotor shaft for an electric machine is provided. The multipart rotor shaft comprises a first shaft journal with a first end flange and with an axial passage bore, a second shaft journal with a second end flange, a hollow carrier for a laminated rotor core, a line element for conducting a cooling medium, and a separating element.

The carrier for the laminated rotor core is arranged between the first shaft journal and the second shaft journal, wherein the carrier, the first end flange and the second end flange delimit a cavity between them. The shaft journals may be connected rotationally fixedly to the carrier, so that when the shaft journals rotate, the carrier also rotates. Similarly, the line element may be connected rotationally fixedly to the carrier and/or to the end flanges, so that when the shaft journals rotate, the line element also rotates.

Furthermore, the line element forms a cooling channel inside the cavity, wherein the cooling channel is connected to the first axial passage bore, extends between the first shaft journal and the second shaft journal, and is connected to an outer part of the cavity which is formed between the carrier and the line element.

Also, the separating element mar divide the outer part of the cavity into a first partial cavity ("left partial cavity") on the side of the first shaft journal, and a second partial cavity ("right partial cavity") on the side of the second shaft journal. For a rigid design. Furthermore, a contribution may be made to supporting a cooling medium supply in the interior of the rotor. In particular, the separating element may be arranged centrally relative to a longitudinal direction of the rotor shaft or line element. In this position, the separating element may produce symmetrically arranged partial cavities of the same volume. The central arrangement furthermore allows a symmetrical application of force to the separating element.

The rotor shaft may provide transport of media, in particular transport of fluids e.g. lubricant or coolant, in particular an insulating cooling fluid such as oil, but also oil mist or gases, through the hollow rotor shaft.

It may be provided that complete flushing does not take place, but merely coating of the surfaces to be cooled with cooling fluid. Thus, with a small quantity of coolant and a correspondingly small volume flow, the quantity flowing through the entire shaft cavity is sufficient to coat only the inner surfaces essential for heat exchange, and in particular an inner casing surface of the carrier. Because of the small coolant quantity, only a correspondingly minimal increase occurs in the moved mass and hence in the moment of inertia.

Heat can be dissipated in the region of the laminated rotor core. It may be provided that the medium is introduced unilaterally, via the first axial passage bore serving as a media inlet, into the cooling channel of the line element, from where it can be supplied to the first partial cavity and second partial cavity so that the medium can coat the inner casing surface of the carrier in order to cool it. In this way, the rotor shaft may be cooled from the inside.

With a corresponding reduction in temperatures, a higher power of the rotor can be achieved for a defined component limit temperature, so that an improved power-to-weight ratio or power-to-volume ratio of an electric machine can be achieved. Thus, allowing a lightweight design of a rotor with little coolant use and efficient cooling. The mass to be rotated can remain low despite the coolant content. A low weight of the rotor is helpful for drive efficiency, since this is a rotating component. This also offers efficiency during an acceleration process. Furthermore, the efficient rotor cooling may allow lowering of the temperature class on use of permanent magnets, which has a savings potential.

The line element only uses slight structural changes to be made to the installed rotor in order to implement the cooling concept and the conduction function, also as a modular solution. The additional line element may be integrated in the rotor shaft and connected to the supply lines via a simple connection geometry, so as to achieve a simple cooling system structure or conduction structure with a minimal number of additional components.

A known approach for weight reduction of the rotor is to punch out partial regions of inactive stack zones. In a present embodiment however, an architecture is created which is restricted to a lamination stack cross-section actively deflecting magnetic flux. In this way, the weight of the rotor and therefore its mass inertia moment may be reduced. A maximal bore diameter of the lamination stack may be selected. Inactive filler material between the rotor shaft and the active electrical sheet material may however be omitted. Instead, the line element is used in the carrier for receiving the laminated rotor core in rotationally fixed fashion, so as to combine a very low weight with a large surface area and hence link lightweight design with optimal rotor cooling.

According to one embodiment, it is provided that the first partial cavity is connected to the cooling channel via at least one first bore of the line element, and that the second partial cavity is connected to the cooling channel via at least one second bore of the line element. In particular, the line element may comprise several first bores and several second bores which are each arranged spaced apart from each other in a circumferential direction. Cooling medium can be supplied from the cooling channel to the first partial cavity and to the second partial cavity via the bores. When the line element rotates, the resulting centrifugal forces can fling the cooling medium from the bores into the partial cavities.

According to a further embodiment, it is provided that the first end flange has at least one first opening for discharging cooling medium from the first partial cavity, and wherein the second end flange has at least one second opening for discharging cooling medium from the second partial cavity. The openings allow cooling medium introduced into the partial cavities to be discharged from there again. In this way, a cooling medium circuit can be produced in a particularly simple fashion.

Furthermore, it may be provided that the separating element protrudes from the line element in the radial direction. This achieves a rigid design which allows high stability.

Also, it may be provided that the separating element is integrally connected to the line element. This can improve the connection between the line element and the separating element.

In one embodiment, furthermore an external pump is provided which is arranged outside the rotor shaft and is configured to convey a cooling medium through the axial passage bore, the cooling channel, the first partial cavity and through the second partial cavity. This embodiment helps keep the rotating masses particularly low, for improving the mass inertia moment of the rotor shaft.

In a further embodiment, an internal pump is provided which is arranged inside the rotor shaft and is driven by the rotor shaft, and is configured to convey a cooling medium through the axial passage bore, the cooling channel, the first partial cavity and through the second partial cavity. This embodiment helps achieve an efficient transport of cooling medium, since the internal pump requires no external energy source and can be implemented simply.

In this context, it is provided that the internal pump comprises a double-suction pump impeller which is rotationally fixedly connected to the line element. The double-suction pump impeller may be implemented as a radial impeller. The double-suction pump impeller may be distinguished in that two impellers are arranged mirror-symmetrically to each other.

Thus, it may be provided that the double-suction pump impeller comprises a first impeller and a second impeller. Here, the first impeller may be arranged inside the first partial cavity and be configured to convey cooling medium present in the cooling channel into the first partial cavity via the at least one first bore of the line element. Similarly, the second impeller may be arranged inside the second partial cavity and be configured to convey cooling medium present in the cooling channel into the second partial cavity via the at least one second bore of the line element.

According to a second aspect, a rotor for an electric machine is provided. The rotor comprises a multipart rotor shaft according to the first aspect, and a laminated rotor core which is rotationally fixedly mounted on the carrier of the multipart rotor shaft.

According to a third aspect, an electric machine for a vehicle is provided. The electric machine comprises a rotor according to the second aspect. The vehicle is, for example, a motor vehicle, such as an automobile, a bus or a truck, or else a rail vehicle, a ship, an aircraft, such as a helicopter or an airplane, or for example a bicycle.

The electric machine which, with ideal heat dissipation, can be constructed comparatively small without the cooling substantially influencing the acceleration behavior, and nonetheless can provide a high permanent electrical power or correspondingly high permanent torque, for use in motor vehicles, in particular in electric or hybrid drive trains of vehicles, since here a high performance capacity with minimal installation space. The electric machine therefore has application in such a field, in that it is used for motor vehicle drive trains, in particular as a motor, generator and/or motor-generator, in serial or parallel hybrid drive trains, and also in purely electric drive trains.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Exemplary embodiments of the invention will be discussed in more detail below on the basis of the partially schematic drawing. The drawings show.

DETAILED DESCRIPTION

Figure 1:
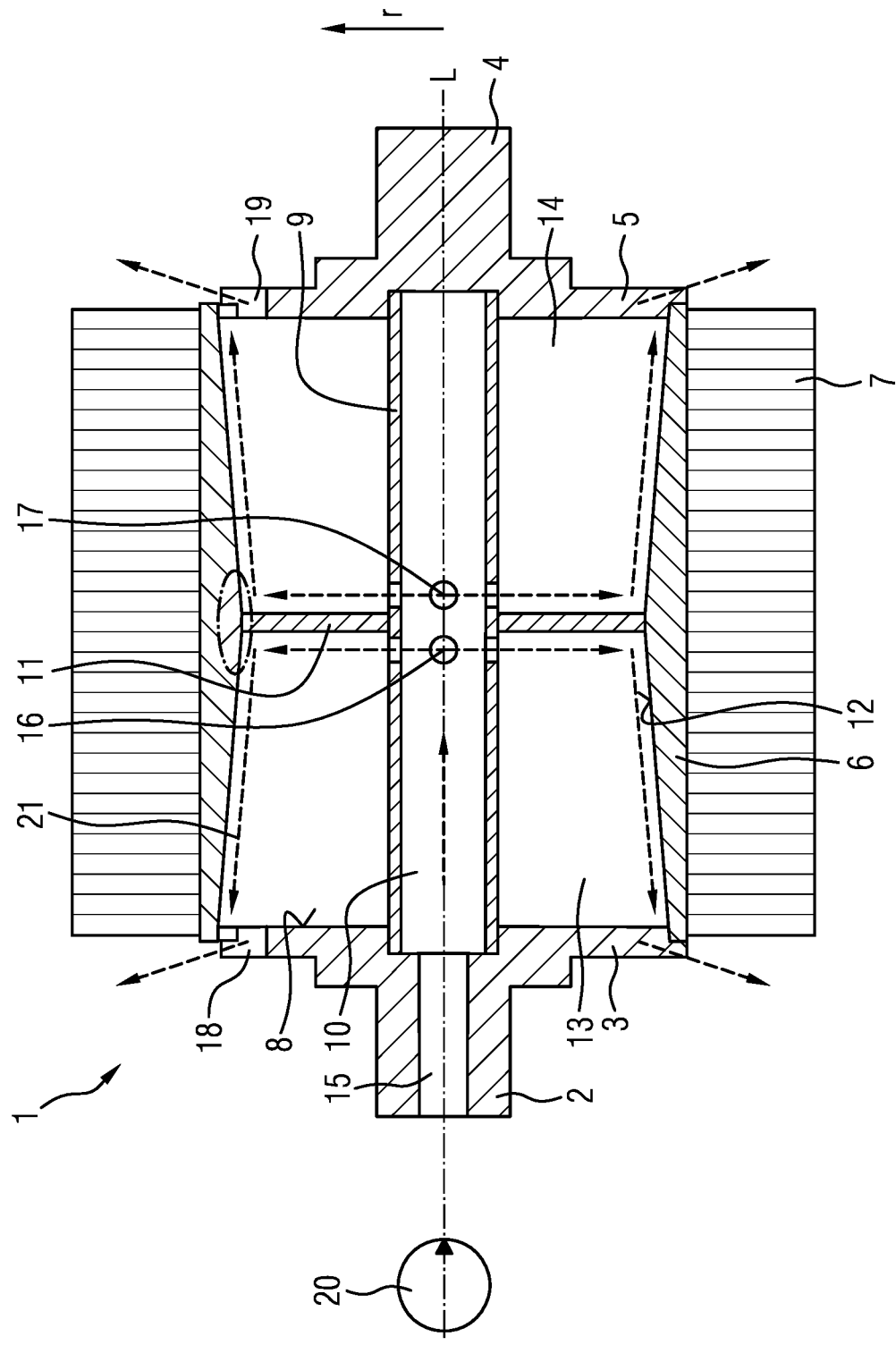
FIG. 1 a longitudinal, sectional depiction of an exemplary embodiment of a rotor shaft according to the invention, with a first partial cavity and a second partial cavity and an external pump.

FIG. 1 shows a rotor shaft 1, which is formed as a hollow shaft. The rotor shaft 1 comprises a first shaft journal 2 with a first end flange 3, and a second shaft journal 4 with a second end flange 5. The rotor shaft 1 furthermore comprises a hollow carrier 6, wherein the carrier 6 rotationally fixedly receives a laminated rotor core 7 which surrounds the carrier 6 in the radial direction r. The hollow carrier 6 may be tubular, wherein a cross-section of the carrier 6, starting from its two end faces pointing away from each other, increases towards the middle of the carrier 6. In this way, the stability of the carrier 6 in the region of a connection to a separating element 11 (see below) is increased. Together, the rotor shaft 1 and the laminated rotor core 7 form a rotor for an electric machine (not shown in detail).

The first end flange 3 terminates the tubular carrier 6 on a first end face, which is shown on the left in FIG. 1. The second end flange 5 terminates the tubular carrier 6 on a second end face, which is shown on the right in FIG. 1. In particular, the carrier 6 may be connected rotationally fixedly to the end flanges 3, 5.

A cavity 8 is delimited between the tubular carrier 6, the first end flange 3 and the second end flange 5. A line element 9 is arranged inside the cavity 8 and forms a cooling channel 10 which, in the exemplary embodiment shown in FIG. 1, runs coaxially around a longitudinal axis L of the rotor shaft 1. In the exemplary embodiment shown, the line element 9 is connected rotationally fixedly to the end flanges 3, 5.

A separating element 11 protrudes perpendicularly from the line element 9. The separating element 11 or the line element 9 rests on an inner casing surface 12 of the carrier 6, and in this region may be connected to the carrier 6 by force fit. Furthermore, the separating element 11 may be integrally connected to the line element, as shown in FIG. 1. Furthermore, where it forms the separating element 11, the line element may have a greater material thickness in order to provide a rigid design.

A free, radially outer part of the cavity 8 remains between the line element 9 and the inner casing surface 12 of the carrier 6. The separating element 11 divides this outer part of the cavity 8 into a first partial cavity 13 and a second partial cavity 14. The first partial cavity 13 ("left partial cavity") is on the left side in FIG. 1 facing the first shaft journal 2, whereas the second partial cavity 14 ("right partial cavity") is on the right side in FIG. 1 facing the second shaft journal 4.

The first shaft journal 2 has an axial passage bore 15 which is fluidically connected to the cooling channel 10. In the exemplary embodiment shown, the cooling channel 10 has a total of four first radial bores 16, which are arranged offset to each other by 90° in the circumferential direction and arranged in the longitudinal direction L on the left in FIG. 1 next to the separating element 11. Similarly, in the exemplary embodiment shown, the cooling channel 10 furthermore has a total of four second radial bores 17, which are arranged offset to each other by 90° in the circumferential direction and arranged in the longitudinal direction L on the right in FIG. 1 next to the separating element 11. The first partial cavity 13 is connected to the cooling channel 10 via the first bores 16, and the second partial cavity 14 is connected to the cooling channel 10 by the second bores 17.

The first end flange 3 has several first openings 18 which connect the first partial cavity 13 to an environment of the rotor shaft 1. The first openings 18 may connect the first partial cavity 13 to a clear space inside a housing of an electric machine (not shown). The first openings 18 in particular fulfil the function of discharging cooling medium from the first partial cavity 13. Similarly, the second end flange 5 has several second openings 19 which connect the second partial cavity 14 to an environment of the rotor shaft 1.

The electric machine may further comprise an external pump 20 which is arranged outside the rotor shaft 1. The external pump 20 need not be driven by the rotor shaft 1. By means of the pump 20, a cooling medium, e.g. a cooling fluid such as oil but also an oil mist, may be conveyed through the axial passage bore 15, the cooling channel 10, the first partial cavity 13 and through the second partial cavity 14. The cooling medium thus passes from the cooling channel 10 into the first partial cavity 13 via the first radial bores 16, and into the second partial cavity 14 via the second radial bores 17.

The cooling medium may be discharged again from the first partial cavity 13 via the first openings 18, and the cooling medium may be discharged again from the second partial cavity 14 via the second openings 19. Then the cooling medium can be drawn in again by the pump 20 and supplied back to the axial passage bore 15, in order thus to create a cooling medium circuit. Possible flow paths of the cooling medium are illustrated in FIG. 1 with flow arrows 21.

Figure 2:
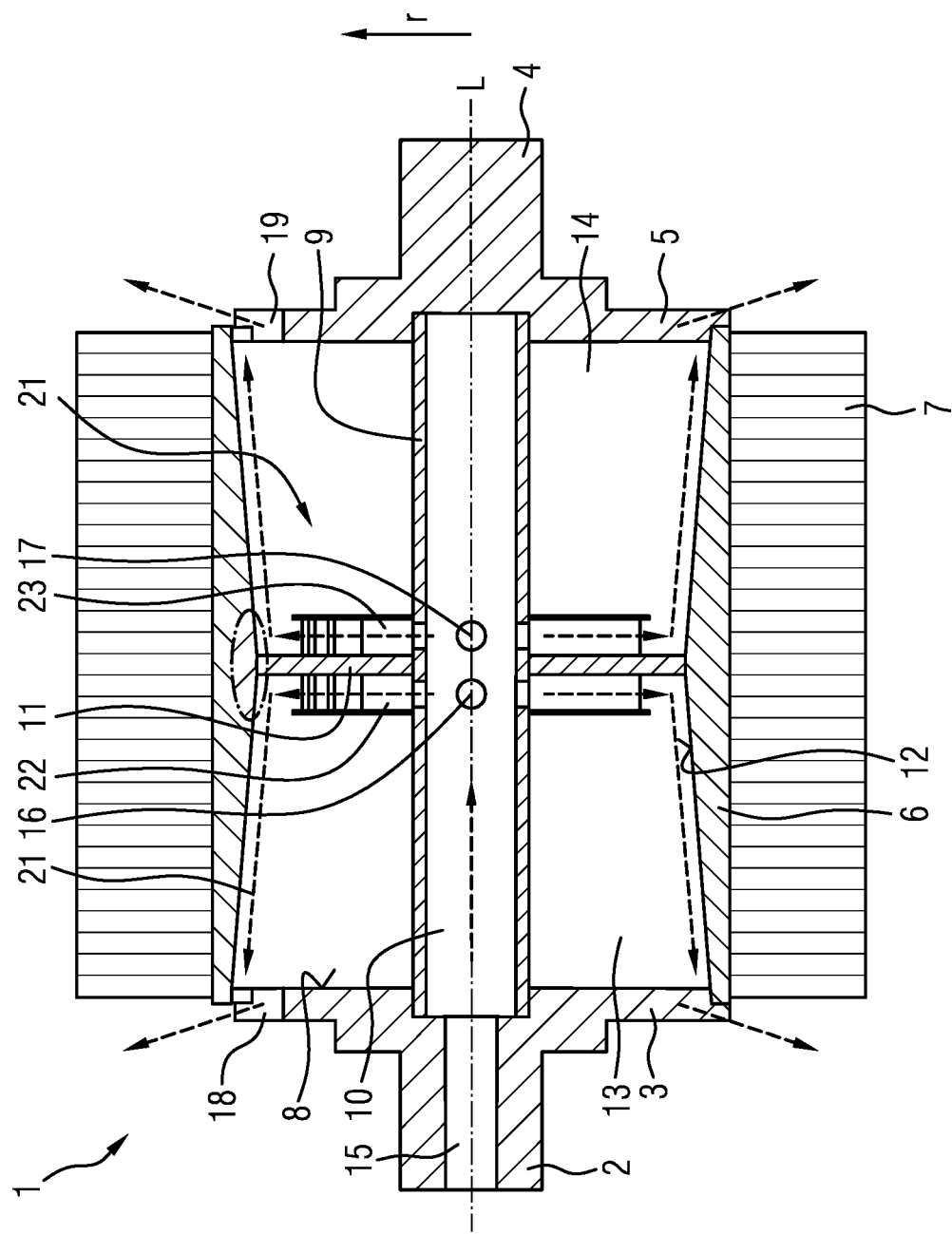
FIG. 2 a longitudinal, sectional depiction of an exemplary embodiment of a rotor shaft according to the invention, with a first partial cavity and a second partial cavity and an internal pump.

FIG. 2 shows an alternative rotor with a hollow rotor shaft 1 which is constructed similarly in principle to the rotor shaft 1 of FIG. 1. The configuration in FIG. 2 however differs from that in FIG. 1 in that there is no external pump 20. Instead, an internal pump 21 is provided which is arranged inside the cavity 8 and driven by the line element 9.

The internal pump 21 comprises a double-suction pump impeller—in the exemplary embodiment shown, a radial impeller—which is connected rotationally fixedly to the line element 9. The double-suction pump impeller comprises a first impeller 22 and a second impeller 23, wherein the impellers 22, 23 are arranged mirror-symmetrically to each other. The first impeller 22 is arranged inside the first partial cavity 13, and the second impeller 23 is arranged inside the second partial cavity 14. Both impellers 22, 23 are rotationally fixedly connected to the line element 9. When the shaft journals 2, 3 rotate, the line element 9 and impellers 22 and 23 therefore also rotate.

The rotating impellers 22 and 23 generate a suction, by means of which coolant can be conveyed into the cooling channel 10 through the axial passage bore 15. Coolant inside the cooling channel 10 can be drawn in further by the suction via the first/second bores 16/17, and conveyed into the first/second partial cavity 13/14. On the other side, the impellers 22 and 23 generate a pressure, by means of which coolant conveyed into the partial cavities 13, 14 can be conveyed out of the cavity 8 via the corresponding openings 18/19.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A multipart rotor shaft for an electric machine, the multipart rotor shaft comprising:
   a first shaft journal with a first end flange and with an axial passage bore;
   a second shaft journal with a second end flange;
   a hollow carrier for a laminated rotor core, wherein the carrier for the laminated rotor core is arranged between the first shaft journal and the second shaft journal and wherein the carrier, the first end flange and the second end flange delimit a cavity between them;
   a line element for conducting a cooling medium, wherein the line element forms a cooling channel inside the cavity, and wherein the cooling channel is connected to the first axial passage bore, extends between the first shaft journal and the second shaft journal, and is connected to an outer part of the cavity which is formed between the carrier and the line element;
   a separating element, wherein the separating element divides the outer part of the cavity into a first partial cavity on the side of the first shaft journal, and a second partial cavity on the side of the second shaft journal; and
   an external pump which is arranged outside the rotor shaft and is configured to convey a cooling medium through the axial passage bore, the cooling channel, the first partial cavity and through the second partial cavity.

2. The multipart rotor shaft as claimed in claim 1, wherein the first partial cavity is connected to the cooling channel via at least one first bore of the line element, and wherein the second partial cavity is connected to the cooling channel via at least one second bore of the line element.

3. The multipart rotor shaft as claimed in claim 1, wherein the first end flange as at least one first opening for discharging cooling medium from the first partial cavity, and wherein the second end flange has at least one second opening for discharging cooling medium from the second partial cavity.

4. The multipart rotor shaft as claimed in claim 1, wherein the separating element protrudes from the line element in the radial direction.

5. The multipart rotor shaft as claimed in claim 1, wherein the separating element is integrally connected to the line element.

6. A multipart rotor shaft for an electric machine, the multipart rotor shaft comprising:
   a first shaft journal with a first end flange and with an axial passage bore;
   a second shaft journal with a second end flange;
   a hollow carrier for a laminated rotor core, wherein the carrier for the laminated rotor core is arranged between the first shaft journal and the second shaft journal and wherein the carrier, the first end flange and the second end flange delimit a cavity between them;
   a line element for conducting a cooling medium, wherein the line element forms a cooling channel inside the cavity, and wherein the cooling channel is connected to the first axial passage bore, extends between the first shaft journal and the second shaft journal, and is connected to an outer part of the cavity which is formed between the carrier and the line element;
   a separating element, wherein the separating element divides the outer part of the cavity into a first partial cavity on the side of the first shaft journal, and a second partial cavity on the side of the second shaft journal; and
   an internal pump driven by the rotor shaft and arranged inside the rotor shaft, to convey a cooling medium through the axial passage bore, the cooling channel, the first partial cavity and through the second partial cavity.

7. The multipart rotor shaft as claimed in claim 6, wherein the internal pump comprises a double-suction pump impeller which is rotationally fixedly connected to the line element.

8. The multipart rotor shaft as claimed in claim 7, wherein the double-suction pump impeller comprises a first impeller and a second impeller,
   the first impeller is arranged inside the first partial cavity and is configured to convey cooling medium present in the cooling channel into the first partial cavity via the at least one first bore of the line element, and
   the second impeller is arranged inside the second partial cavity and is configured to convey cooling medium present in the cooling channel into the second partial cavity via the at least one second bore of the line element.

9. A rotor for an electric machine, the rotor comprising a multipart rotor shaft and a laminated rotor core which is rotationally fixedly mounted on a carrier of the multipart rotor shaft, wherein the rotor shaft comprising;
   a first shaft journal with a first end flange and with an axial passage bore;
   a second shaft journal with a second end flange;
   wherein the carrier is a hollow carrier arranged between the first shaft journal and the second shaft journal and wherein the carrier, the first end flange and the second end flange delimit a cavity between them;
   a line element for conducting a cooling medium, wherein the line element forms a cooling channel inside the cavity and connected to the first axial passage bore, extends between the first shaft journal and the second shaft journal, and is connected to an outer part of the cavity formed between the carrier and the line element; and
   a separating element, wherein the separating element divides the outer part of the cavity into a first partial cavity on the side of the first shaft journal, and a second partial cavity on the side of the second shaft journal; and
   an external pump which is arranged outside the rotor shaft and is configured to convey a cooling medium through the axial passage bore, the cooling channel, the first partial cavity and through the second partial cavity.

10. The rotor as claimed in claim 9, wherein the first partial cavity is connected to the cooling channel via at least one first bore of the line element, and wherein the second partial cavity is connected to the cooling channel via at least one second bore of the line element.

11. The rotor as claimed in claim 9, wherein the first end flange as at least one first opening for discharging cooling medium from the first partial cavity, and wherein the second end flange has at least one second opening for discharging cooling medium from the second partial cavity.

12. The rotor as claimed in claim 9, wherein the separating element protrudes from the line element in the radial direction.

13. The rotor as claimed in claim 9, wherein the separating element is integrally connected to the line element.

14. A rotor for an electric machine, the rotor comprising a multipart rotor shaft and a laminated rotor core which is rotationally fixedly mounted on a carrier of the multipart rotor shaft, wherein the rotor shaft comprising;
   a first shaft journal with a first end flange and with an axial passage bore;
   a second shaft journal with a second end flange;
   wherein the carrier is a hollow carrier arranged between the first shaft journal and the second shaft journal and wherein the carrier, the first end flange and the second end flange delimit a cavity between them;
   a line element for conducting a cooling medium, wherein the line element forms a cooling channel inside the cavity and connected to the first axial passage bore, extends between the first shaft journal and the second shaft journal, and is connected to an outer part of the cavity formed between the carrier and the line element;
   a separating element, wherein the separating element divides the outer part of the cavity into a first partial cavity on the side of the first shaft journal, and a second partial cavity on the side of the second shaft journal; and
   an internal pump which is arranged inside the rotor shaft and is driven by the rotor shaft, and is configured to convey a cooling medium through the axial passage bore, the cooling channel, the first partial cavity and through the second partial cavity.

15. The rotor as claimed in claim 14, wherein the internal pump comprises a double-suction pump impeller which is rotationally fixedly connected to the line element.

16. The rotor as claimed in claim 15, wherein the double-suction pump impeller comprises a first impeller and a second impeller,
   the first impeller is arranged inside the first partial cavity and is configured to convey cooling medium present in the cooling channel into the first partial cavity via the at least one first bore of the line element, and
   the second impeller is arranged inside the second partial cavity and is configured to convey cooling medium present in the cooling channel into the second partial cavity via the at least one second bore of the line element.

* * * * *